United States Patent
Yamamoto et al.

(10) Patent No.: US 7,046,824 B2
(45) Date of Patent: May 16, 2006

(54) SYSTEM AND METHOD OF PRESENTING ALTITUDE VISIBILITY INFORMATION PROVISION SYSTEM UTILIZING SATELLITE IMAGE, AND SYSTEM AND METHOD OF RECOGNIZING FLIGHT OBSTACLE

(75) Inventors: Hiromichi Yamamoto, Chofu (JP); Kohzo Homma, Chofu (JP); Satoru Kitagata, Kamakura (JP)

(73) Assignees: Japan Aerospace Exploration Agency, Tokyo (JP); Mitsubishi Space Software Co., Ltd., Tokyo (JP)

( * ) Notice: Subject to any disclaimer, the term of this patent is extended or adjusted under 35 U.S.C. 154(b) by 653 days.

(21) Appl. No.: 10/251,806

(22) Filed: Sep. 23, 2002

(65) Prior Publication Data

US 2003/0081812 A1 May 1, 2003

(30) Foreign Application Priority Data

Oct. 26, 2001 (JP) ............................. 2001-329773

(51) Int. Cl.
*G06K 7/00* (2006.01)
*G06K 9/00* (2006.01)
*G06K 9/46* (2006.01)
*G08B 21/00* (2006.01)
*H04N 9/47* (2006.01)

(52) U.S. Cl. ..................... 382/103; 382/203; 340/945; 348/113; 348/144; 701/3

(58) Field of Classification Search ................ 382/103, 382/104, 108, 203; 340/945, 963; 348/113, 348/143, 144; 701/2, 3, 10, 14
See application file for complete search history.

(56) References Cited

U.S. PATENT DOCUMENTS

| | | | | |
|---|---|---|---|---|
| 4,489,389 A | * | 12/1984 | Beckwith et al. | ............ 345/421 |
| 4,646,244 A | * | 2/1987 | Bateman et al. | ............ 701/301 |
| 4,682,160 A | * | 7/1987 | Beckwith et al. | ............ 345/421 |
| 4,829,304 A | * | 5/1989 | Baird | ......................... 342/63 |
| 4,835,537 A | * | 5/1989 | Manion | ....................... 342/30 |
| 4,985,854 A | * | 1/1991 | Wittenburg | ................. 345/421 |
| 5,072,396 A | * | 12/1991 | Fitzpatrick et al. | ......... 701/217 |
| 5,115,398 A | * | 5/1992 | De Jong | ..................... 701/200 |
| 5,124,915 A | * | 6/1992 | Krenzel | ........................ 702/5 |
| 5,204,818 A | * | 4/1993 | Landecker et al. | ......... 701/226 |

(Continued)

Primary Examiner—Jingge Wu
Assistant Examiner—Anthony Mackowey
(74) Attorney, Agent, or Firm—Wenderoth, Lind & Ponack, L.L.P.

(57) ABSTRACT

A satellite image analysis and processing apparatus includes a DEM extraction unit for extracting digital elevation model information having topography data and steeple-shaped building data; a topography situation recognition unit for discriminating a kind of topography and recognizing a topographic situation from the topography data of the digital elevation model information; a steeple-shaped building recognition unit for recognizing shape and location information of steeple-shaped buildings from the steeple-shaped building data of the digital elevation model information; a time series recognition unit for recognizing a change with time; and an altitude visibility information preservation unit for preserving altitude visibility information obtained by combining information acquired by the topography situation recognition unit, information acquired by the steeple-shaped building recognition unit, and information acquired by the time series recognition unit in an altitude visibility information database provided in the altitude visibility information preservation apparatus.

12 Claims, 8 Drawing Sheets

U.S. PATENT DOCUMENTS

| | | | |
|---|---|---|---|
| 5,309,522 A * | 5/1994 | Dye | 382/154 |
| 5,381,338 A * | 1/1995 | Wysocki et al. | 701/207 |
| 5,719,567 A * | 2/1998 | Norris | 340/953 |
| 5,907,641 A * | 5/1999 | Corvi et al. | 382/278 |
| 6,199,008 B1 * | 3/2001 | Aratow et al. | 701/120 |
| 6,470,265 B1 * | 10/2002 | Tanaka | 701/208 |
| 6,735,550 B1 * | 5/2004 | Weekley et al. | 702/182 |
| 6,828,922 B1 * | 12/2004 | Gremmert et al. | 340/949 |

* cited by examiner

FIG.3
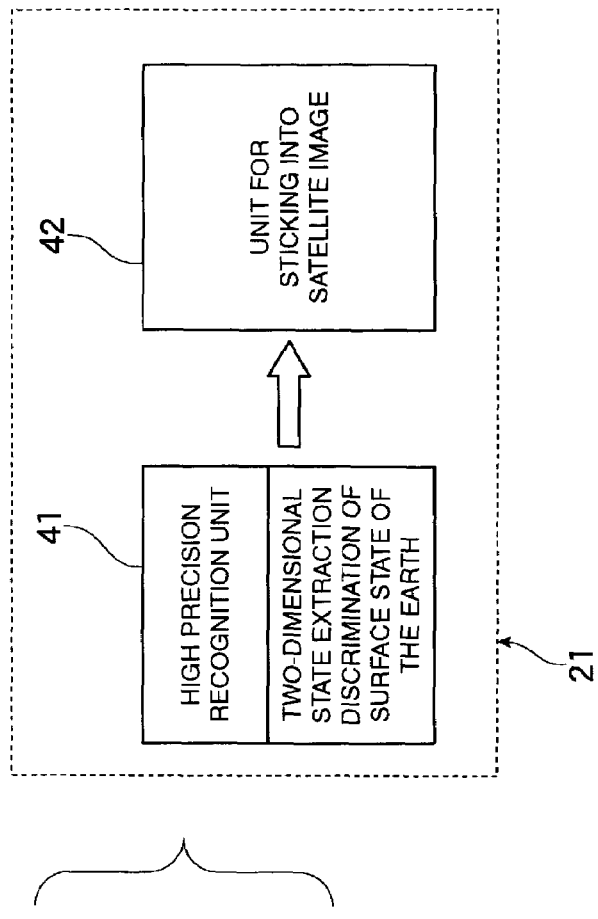
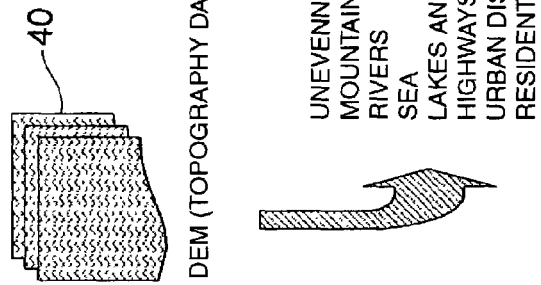

SYSTEM AND METHOD OF PRESENTING ALTITUDE VISIBILITY INFORMATION PROVISION SYSTEM UTILIZING SATELLITE IMAGE, AND SYSTEM AND METHOD OF RECOGNIZING FLIGHT OBSTACLE

BACKGROUND OF THE INVENTION

1. Field of the Invention

The present invention relates to a system for and a method of presenting altitude visibility information on the basis of a high resolution satellite image information obtained from an observation satellite in an orbit round the earth, and also relates to a system for and a method of recognizing a flight obstacle for displaying a location of an aircraft and a topographical map in the aircraft by utilizing the altitude visibility information and giving a warning of fault obstacle information.

2. Related Art of the Invention

In flight security for an aircraft, it is extremely important to obtain topographical information of the vicinity of the flight path. In a conventional system that obtains topographical information of the vicinity of the flight path, medium that are comparatively stationary and that are not updated frequently, such as map information and aerial photograph, are the nuclei. It is therefore difficult to utilize timely information concerning a topographical change.

On the other hand, as means for obtaining topographical information covering a wide area, progress of a remote image pickup technique from an observation satellite in an orbit around the earth has been remarkable. In recent years, achievement of a higher resolution has been attempted, and not only the conventional two-dimensional image information, but progress has also been made in extraction of three-dimensional image information.

A characteristic advantage of satellite image information obtained from the observation satellite resides in that the changing situation of the ground surface can be captured by periodic image pickup and the image of the whole range on the earth can be picked up.

As conventional flight security means for an aircraft, the GPWS (Ground Proximity Warning System) is used and mounted on a large-sized aircraft.

In the GPWS, a radar is used to sense obstacles. However, sensing of abnormal proximity information is limited to a narrow range over which the radar extends. This results in a problem that a warning is not given until the obstacle becomes very near the aircraft. Even if the pilot attempts to cope with the warning, the pilot cannot know the relative relation between the abnormal proximity point and the travel direction of the aircraft and avoid the obstacle in many cases. Furthermore, there is a problem that a linear obstacle such as a high-voltage transmission line cannot be detected by radar.

As for small-sized aircraft such as helicopters, there are many factors that obstruct safe flight, such as contact with steel tower structures (including transmission lines) and steeple-shaped buildings including tall buildings, altitude misconception in landing on a snow surface and bad altitude visibility due to fog or rain.

SUMMARY OF THE INVENTION

The present invention was conceived in view of the above-described points, and an object of the present invention is to provide a system for and a method of creating and presenting altitude visibility information, which represents the topography, steeple-shaped buildings, and temporal changes of smoke and snow surfaces, and also to provide a system for and a method of recognizing a flight obstacle for delivering the altitude visibility information to an aircraft, combining the aircraft location information and topographical information, displaying resultant synthetic information on a screen mounted on the aircraft, and previously giving a warning of obstacle information.

The above and other objects of the present invention can be achieved by providing, in one aspect, an altitude visibility information provision system including a satellite image analysis and processing apparatus and an altitude visibility information preservation apparatus, the satellite image analysis and processing apparatus including: a DEM (digital elevation model) extraction unit for extracting digital elevation model information having topography data and steeple-shaped building data from satellite image information of stereopairs differing in resolution obtained by picking up an image of ground surface and received from an observation satellite on an orbit around the earth via a communication line and high resolution satellite image information processed based on the satellite image information; a topography situation recognition unit for discriminating a kind of topography and recognizing a topographic situation from the topography data of the digital elevation model information; a steeple-shaped building recognition unit for recognizing shape and location information of steeple-shaped buildings from the steeple-shaped building data of the digital elevation model information; and an altitude visibility information preservation unit for preserving altitude visibility information obtained by combining information acquired by the topography situation recognition unit and information acquired by the steeple-shaped building recognition unit in an altitude visibility information database provided in the altitude visibility information preservation apparatus.

According to this aspect, altitude visibility information of the entire world can be created. Therefore, the system can be used not only for the flight obstacle recognition for safety, but also for the selection of a flight path so as to avoid densely housed districts on the basis of the altitude visibility information and thereby solving the noise problem of the airplane. Otherwise, the system can be used for an enhanced function system of air traffic control by utilizing the altitude visibility information together with a pilot training simulator or a radar.

In a second aspect of the present invention, there is also provided an altitude visibility information provision system including a satellite image analysis and processing apparatus and an altitude visibility information preservation apparatus, the satellite image analysis and processing apparatus including: a DEM (digital elevation model) extraction unit for extracting digital elevation model information having topography data and steeple-shaped building data from satellite image information of stereopairs differing in resolution obtained by picking up an image of ground surface and received from an observation satellite on an orbit round the earth via a communication line and high resolution satellite image information processed based on the satellite image information; a topography situation recognition unit for discriminating a kind of topography and recognizing a topographic situation from the topography data of the digital elevation model information; a steeple-shaped building recognition unit for recognizing shape and location information of steeple-shaped buildings from the steeple-shaped building data of the digital elevation model information; a time series recognition unit for recognizing a change with time by comparing the high resolution satellite image information received last time with the high resolution satellite image information of same location received this time; and an altitude visibility information preservation unit for preserving altitude visibility information obtained by combining information acquired by the topography situation recognition unit, information acquired by the steeple-shaped building recognition unit, and information acquired by the time series recognition unit in an altitude visibility information database provided in the altitude visibility information preservation apparatus.

According to this aspect, the altitude visibility information of the entire world can be created. Therefore, the system can be used not only for the flight obstacle recognition for safety, but also for the selection of a flight path so as to avoid densely housed districts on the basis of the altitude visibility information and thereby solving the noise problem of the airplane. Otherwise, the system can be used for an enhanced function system of air traffic control by utilizing the altitude visibility information together with a pilot training simulator or a radar.

In the above aspects, the present invention further provides a flight obstacle presentation apparatus mounted on an aircraft, the flight obstacle presentation apparatus including: a display unit for combining the altitude visibility information of the altitude visibility information provision system according to the above aspects with the location information and attitude information of the aircraft, and displaying altitude visibility information for flight obstacle recognition such as a topographic map including an image taken from a viewpoint of a pilot and a location of the aircraft; and a warning sound emission unit for emitting a warning sound when a flight obstacle is sensed and the flight obstacle is displayed on the display unit.

According to the above feature, the altitude visibility information for flight obstacle recognition can be displayed on the display mounted on the aircraft with the viewpoint switched over. In the case where the image is displayed with the viewpoint of the pilot, approaching of the aircraft to an obstacle causes enlarged display of the obstacle and nearby topography. In addition, a variable-frequency warning sound in which the frequency changes according to the obstacle and the danger state can be emitted. Therefore, it becomes possible for the pilot to definitely recognize the location relations among the aircraft, the surrounding topography situation, and the flight obstacle. Accordingly, the pilot can take safety measures previously.

Furthermore, according to the present invention, there is also provided a flight obstacle recognition system including an altitude visibility information downloading apparatus for downloading the altitude visibility information of the altitude visibility information provision system according to the above-mentioned aspects to the flight obstacle presentation apparatus also mentioned above via a communication line.

According to this view point, by using the altitude visibility information created from the high resolution satellite image for the purpose of flight obstacle recognition, it becomes possible to prevent a clash with a mountain at the time of poor visibility caused by fog or rain, or a contact accident with a steeple-shaped building such as a steel tower structure (including a transmission line) or a tall building in the flight paths over the entire world. It also becomes possible to acquire the flow direction of time-varying smoke and improve the safety of landing on time-varying snow surface or the like which tends to cause height misconception.

In a further aspect of the present invention, there is also provided a method for providing altitude visibility information, including the steps of: extracting digital elevation model information having topography data and steeple-shaped building data from satellite image information of stereopairs differing in resolution obtained by picking up an image of ground surface and received from an observation satellite on an orbit round the earth via a communication line and high resolution satellite image information processed based on the satellite image information; discriminating a kind of topography and recognizing a topographic situation from the topography data of the digital elevation model information; recognizing shape and location information of steeple-shaped buildings from the steeple-shaped building data of the digital elevation model information; and preserving altitude visibility information obtained by combining information acquired at the topography situation recognizing step and information acquired at the steeple-shaped building recognizing step in an altitude visibility information database.

According to this aspect, the altitude visibility information of the entire world can be created. Therefore, the system can be used not only for flight obstacle recognition for safety, but also for selecting a flight path so as to avoid densely housed districts on the basis of the altitude visibility information and thereby solving the noise problem of the airplane. In addition, the system can be used for an enhanced function system of air traffic control by utilizing the altitude visibility information together with a pilot training simulator or a radar.

In a still further aspect, there is provided a method for providing altitude visibility information, including the steps of: extracting digital elevation model information having topography data and steeple-shaped building data from satellite image information of stereopairs differing in resolution obtained by picking up an image of ground surface and received from an observation satellite on an orbit round the earth via a communication line and high resolution satellite image information processed based on the satellite image information; discriminating a kind of topography and recognizing a topographic situation from the topography data of the digital elevation model information; recognizing shape and location information of steeple-shaped buildings from the steeple-shaped building data of the digital elevation model information; and recognizing a change with time by comparing the high resolution satellite image information received last time with the high resolution satellite image information of same location received this time; and preserving altitude visibility information obtained by combining information acquired at the topography situation recognizing step, information acquired at the steeple-shaped building recognizing step, and information acquired at the change with time recognizing step in an altitude visibility information database.

According to this aspect, the altitude visibility information of the entire world can be created. Therefore, the system can be used not only for flight obstacle recognition for safety, but also for selecting a flight path so as to avoid densely housed districts on the basis of the altitude visibility information and thereby solving the noise problem of the airplane. In addition, the system can be used for an enhanced function system of air traffic control by utilizing the altitude visibility information together with a pilot training simulator or a radar.

In the above aspects of the method of the present invention, there is also provided a method for presenting flight obstacles in a flight obstacle presentation apparatus of an aircraft, the method including the steps of: combining the altitude visibility information of the altitude visibility information provision method mentioned above with location information and attitude information of the aircraft, and displaying altitude visibility information for flight obstacle recognition such as a topographic map including an image taken from a viewpoint of a pilot and a location of the aircraft on a display of the flight obstacle presentation apparatus; and emitting a warning sound when a flight obstacle is sensed and the flight obstacle is displayed on the display of the flight obstacle presentation apparatus.

According to this aspect, the altitude visibility information for flight obstacle recognition can be displayed on the display mounted on the aircraft with the viewpoint switched over. In the case where the image is displayed with the viewpoint of the pilot, approaching of the aircraft to an obstacle causes enlarged display of the obstacle and nearby topography. In addition, a variable-frequency warning sound in which the frequency changes according to the obstacle and the danger state can be emitted. Therefore, it becomes possible for the pilot to definitely recognize the location relations among the aircraft, the surrounding topography situation, and the flight obstacle. Accordingly, the pilot can take safety measures previously.

Furthermore, there is provided a flight obstacle recognition method including the step of downloading the altitude visibility information of the altitude visibility information provision method mentioned above to the flight obstacle presentation apparatus via a communication line.

According to this aspect, by using the altitude visibility information created from the high resolution satellite image for the purpose of flight obstacle recognition, it becomes possible to prevent a clash with a mountain at the time of poor visibility caused by fog or rain, or a contact accident with a steeple-shaped building such as a steel tower structure (including a transmission line) or a tall building in the flight paths over the entire world. It also becomes possible to acquire the flow direction of time-varying smoke and improve the safety of landing on time-varying snow surface or the like which tends to cause height misconception.

It is to be noted that the nature and further characteristic features of the present invention will be made more clear from the following descriptions made with reference to the accompanying drawings.

BRIEF DESCRIPTION OF THE DRAWINGS

In the accompanying drawings:

FIG. 3 is a functional block diagram of a topography situation recognition unit of a flight obstacle recognition system according to the present invention;

DESCRIPTION OF THE PREFERRED
EMBODIMENTS

Figure 1:
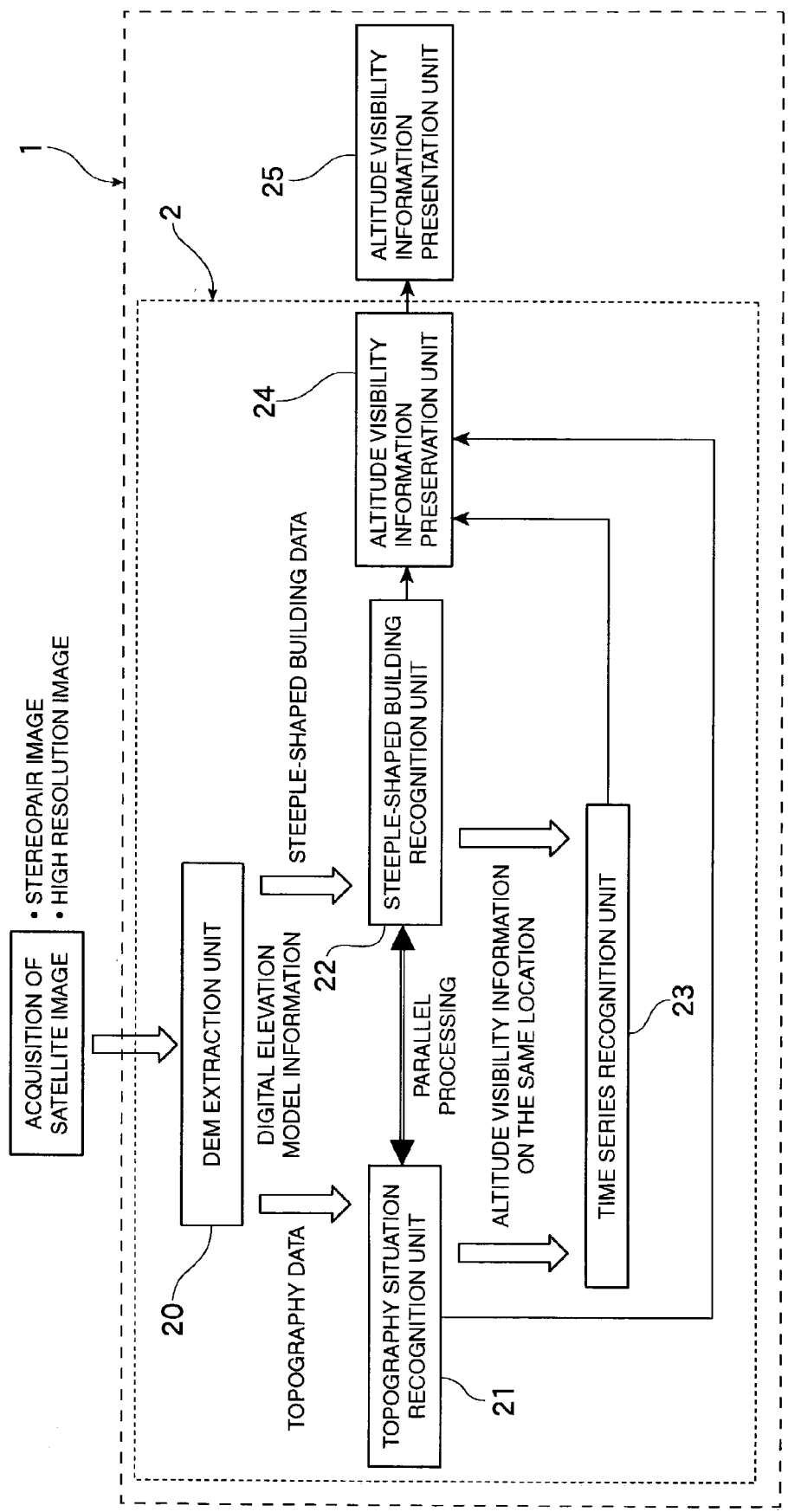
FIG. 1 is a functional block diagram of a flight obstacle recognition system according to the present invention.

FIG. 1 is a functional block diagram of a flight obstacle recognition system according to the present invention.

With reference to FIG. 1, a flight obstacle recognition system 1 includes an altitude visibility information provision system 2 and an altitude visibility information presentation unit 25. The altitude visibility information provision system 2 includes a DEM (Digital Elevation Model) extraction unit 20, a topography situation recognition unit 21, a steeple-shaped building recognition unit 22, a time series recognition unit 23, and an altitude visibility information preservation unit 24.

An outline of units included in the flight obstacle recognition system 1 shown in FIG. 1 will be described hereunder.

The DEM extraction unit 20 reads high resolution satellite image information of stereopair of a plurality of resolutions acquired from an observation satellite 9, conducts data fusion such as image registration and resolution switchover, and outputs resultant information as digital elevation model (DEM) information. The DEM extraction unit 20 can be implemented by using, for example, a conventional technique.

The topography situation recognition unit 21 discriminates a kind of topography (such as a mountain, sea, or an urban district) on the basis of topography data of digital elevation model information extracted by the DEM extraction unit 20, recognizes the state of the ground surface such as ups and downs, extracts flight obstacles and danger areas, and adds colors or the like to the flight obstacles and danger areas so as to be distinguishable from others. The topography situation recognition unit 21 is mainly a recognition unit of topography situations such as mountain topography and rivers in a wide area. Owing to the topography situation recognition unit 21, it becomes possible to grasp a topography situation of a wide area along a flight path.

On the basis of the steeple-shaped building data of the digital elevation model information extracted by the DEM extraction unit 20, the steeple-shaped building recognition unit 22 discriminates shapes of steeple-shaped buildings in a comparatively narrow area and location information including latitude, longitude and altitudes in detail, extracts steeple-shaped buildings, and adds colors or the like to the steeple-shaped buildings so as to be distinguishable from others. The steeple-shaped building data mentioned herein is information of obstacles such as steel tower structures including transmission lines and tall buildings. The steeple-shaped building recognition unit 22 is mainly a recognition unit for small-sized aircraft, such as helicopters, flying at low altitudes and obstacles in the vicinity of airfields.

The topography situation recognition unit 21 and the steeple-shaped building recognition unit 22 conduct processing in parallel.

By comparing altitude visibility information preserved last time in an altitude visibility information database 4a (see FIG. 6) of an altitude visibility information preservation apparatus 4 with altitude visibility information received from the observation satellite 9 and processed this time by the topography situation recognition unit 21 and the steeple-shaped building recognition unit 22 on the same location, the time series recognition unit 23 recognizes time-varying digital elevation model (DEM)information on the same location. It becomes possible to recognize changes of a snow surface and a desert surface, a topography situation such as smoke of a volcano and a fog flow, and a change of the atmosphere state, besides new buildings.

The altitude visibility information preservation unit 24 preserves altitude visibility information obtained by the topography situation recognition unit 21, the steeple-shaped building recognition unit 22 and the time series recognition unit 23 in the altitude visibility information database 4a of the altitude visibility information preservation apparatus 4.

The altitude visibility information presentation unit 25 combines the altitude visibility information, which is preserved in the altitude visibility information database 4a of the altitude visibility information preservation apparatus 4 by the altitude visibility information preservation unit 24, with location information and posture information of aircraft 12, and displays altitude visibility information for flight obstacle recognition such as a topographical map including an image taken from a view point of a pilot and locations of the aircraft 12, on a display 14 or the like of the flight obstacle presentation apparatus 13. When an obstacle is sensed on the display 14, a warning is given by using speech, an alarm sound, or the like.

Further, the respective units mentioned above will be described in detail hereunder with reference to FIGS. 2 to 7.

Figure 2:
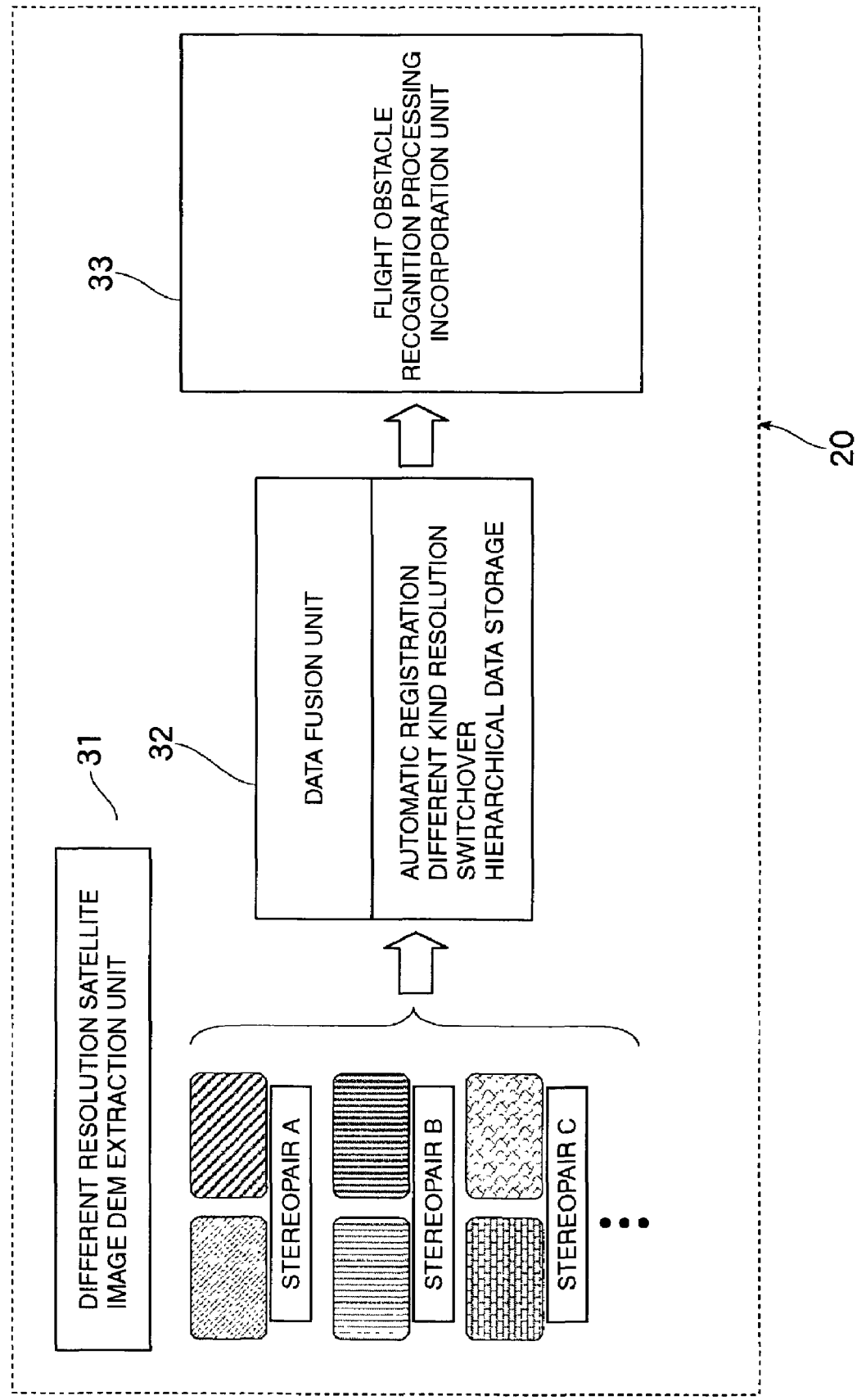
FIG. 2 is a functional block diagram of a DEM extraction unit of a flight obstacle recognition system according to the present invention.

FIG. 2 shows a function block diagram of the DEM extraction unit of the flight obstacle recognition system according to the present invention.

The DEM extraction unit 20 includes a different resolution satellite image DEM extraction unit 31, a data fusion unit 32, and a flight obstacle recognition processing incorporation unit 33.

The different resolution satellite image DEM extraction unit 31 receives a plurality of high resolution satellite image information pieces differing in resolution such as a wide area image of mountain topography having a relatively low resolution and a detailed image having a high resolution used for recognition of steeple-shaped buildings such as steel towers and transmission lines. These high resolution satellite image information pieces are sets of two images, i.e., left and right images of the same area picked up from different points so as to create a three-dimensional image. These are referred to as stereopairs 30.

The stereopairs 30 are subjected in the data fusion unit 32 to processing, such as automatic registration for automatically registering corresponding locations of the stereopairs 30, different resolution switchover for switching different resolution over to the same resolution, and hierarchical data storage for storing wide area images, detailed images, and altitude visibility information pieces from resolution to resolution.

The altitude visibility information thus hierarchically stored is subjected, in the flight obstacle recognition processing incorporation unit 33, to interface processing for delivering data to the topography situation recognition unit 21 and the steeple-shaped building recognition unit 22.

FIG. 3 shows a functional block diagram of the topography situation recognition unit of the flight obstacle recognition system according to the present invention.

The topography situation recognition unit 21 includes a high precision recognition unit 41 and a unit 42 for sticking into a satellite image.

The flight obstacle recognition processing incorporation unit 33 delivers topography data 40 of the digital elevation model information to the topography situation recognition unit 21. The topography data 40 is analyzed as two-dimensional data by the high precision recognition unit 41. Thus, the kind of topography (such as mountain topography, rivers, sea, lakes and marshes, highways, urban districts, residential areas, and dense factory areas) is discriminated, and the surface state of the earth, such as the surface undulations of the earth and location information, is recognized. In addition, flight obstacles such as mountain areas and buildings, danger areas and the like are extracted from the topography data 40 and provided with a color representing a warning, such as a red color and also provided with numerical value information of altitudes of the flight obstacles and danger areas.

As for the method for discriminating the kind of topography, there are various methods. For example, as for the method for discriminating between sea and land, there is a method of distinguishing between sea and land on the basis of a difference in luminance distribution of the image signal between sea and land and thereby extracting a coastline.

The information of these surface states of the earth is combined with the digital elevation model information by using the satellite image sticking unit 42. Altitude visibility information with the flight obstacles and danger areas recognized is thus created.

Figure 4:
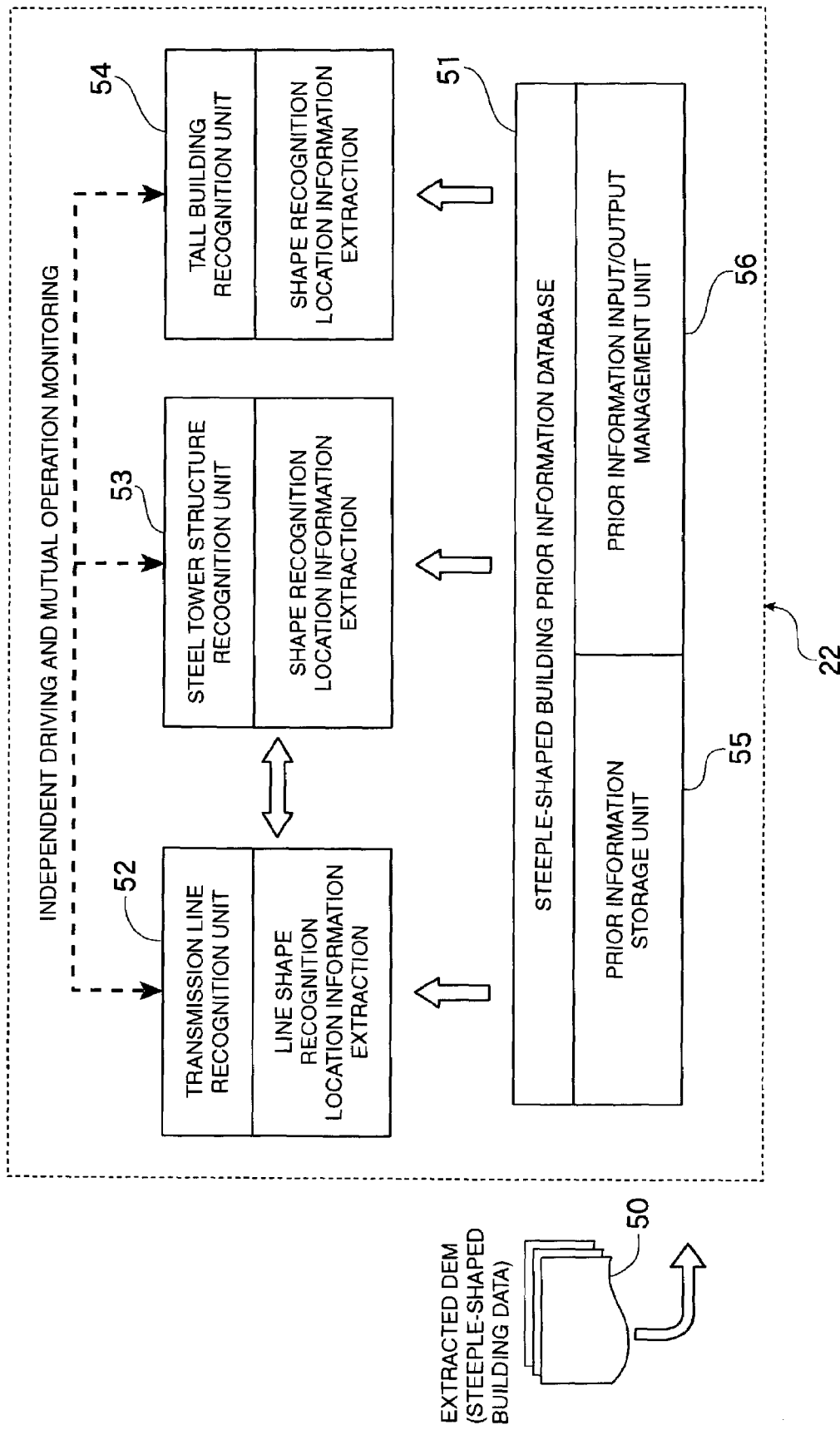
FIG. 4 is a functional block diagram of a steeple-shaped building recognition unit of a flight obstacle recognition system according to the present invention.

FIG. 4 shows a function block diagram of the steeple-shaped building recognition unit 22 of the flight obstacle recognition system according to the present invention.

The steeple-shaped building recognition unit 22 includes a transmission line recognition unit 52, a steel tower structure recognition unit 53, a tall building recognition unit 54, a steeple-shaped building prior information database 51, a prior information storage unit 55 and a prior information input/output management unit 56.

Steeple-shaped building data 50 of the digital elevation model information supplied from the flight obstacle recognition processing incorporation unit 33 is stored in the steeple-shaped building prior information database 51 by the prior information storage unit 55. Input/output control of the steeple-shaped building data 50 to/from the transmission line recognition unit 52, the steel tower structure recognition unit 53 and the tall building recognition unit 54 is conducted by the prior information input/output management unit 56.

The steeple-shaped building data 50 delivered to the transmission line recognition unit 52 under the control of the prior information input/output management unit 56 is analyzed to determine whether it is information of a transmission line image or not. If it is the information of the transmission line image, then the line shape of the transmission line is recognized and the location information including the latitude, longitude, and altitude is extracted.

In the same way, the steeple-shaped building data 50 delivered to the steel tower structure recognition unit 53 is analyzed to determine whether it is information of a steel tower structure image or not. If it is the information of the steel tower structure image, then the shape of the steel tower structure is recognized, and the location information is extracted.

In addition, the steeple-shaped building data 50 delivered to the tall building recognition unit 54 is analyzed to determine whether it is information of a tall building image or not. If it is the information of the tall building image, then the shape of the tall building is recognized, and the location information is extracted.

From these kinds of information, steeple-shaped buildings that constitute flight obstacles are extracted. The extracted steeple-shaped buildings are provided with a color representing a warning, such as a red color, and provided with numerical value information of altitudes.

The steeple-shaped building data 50 of the same area is delivered from the steeple-shaped building prior information database 51 to the transmission line recognition unit 52, the steel tower structure recognition unit 53 and the tall building recognition unit 54 by the prior information input/output management unit 56. Processing is conducted in the transmission line recognition unit 52, the steel tower structure recognition unit 53 and the tall building recognition unit 54, independently. However, the transmission line recognition unit 52, the steel tower structure recognition unit 53 and the tall building recognition unit 54 simultaneously conduct the recognition and extraction of the steeple-shaped buildings of the same area, while mutually monitoring the operation state.

Figure 5:
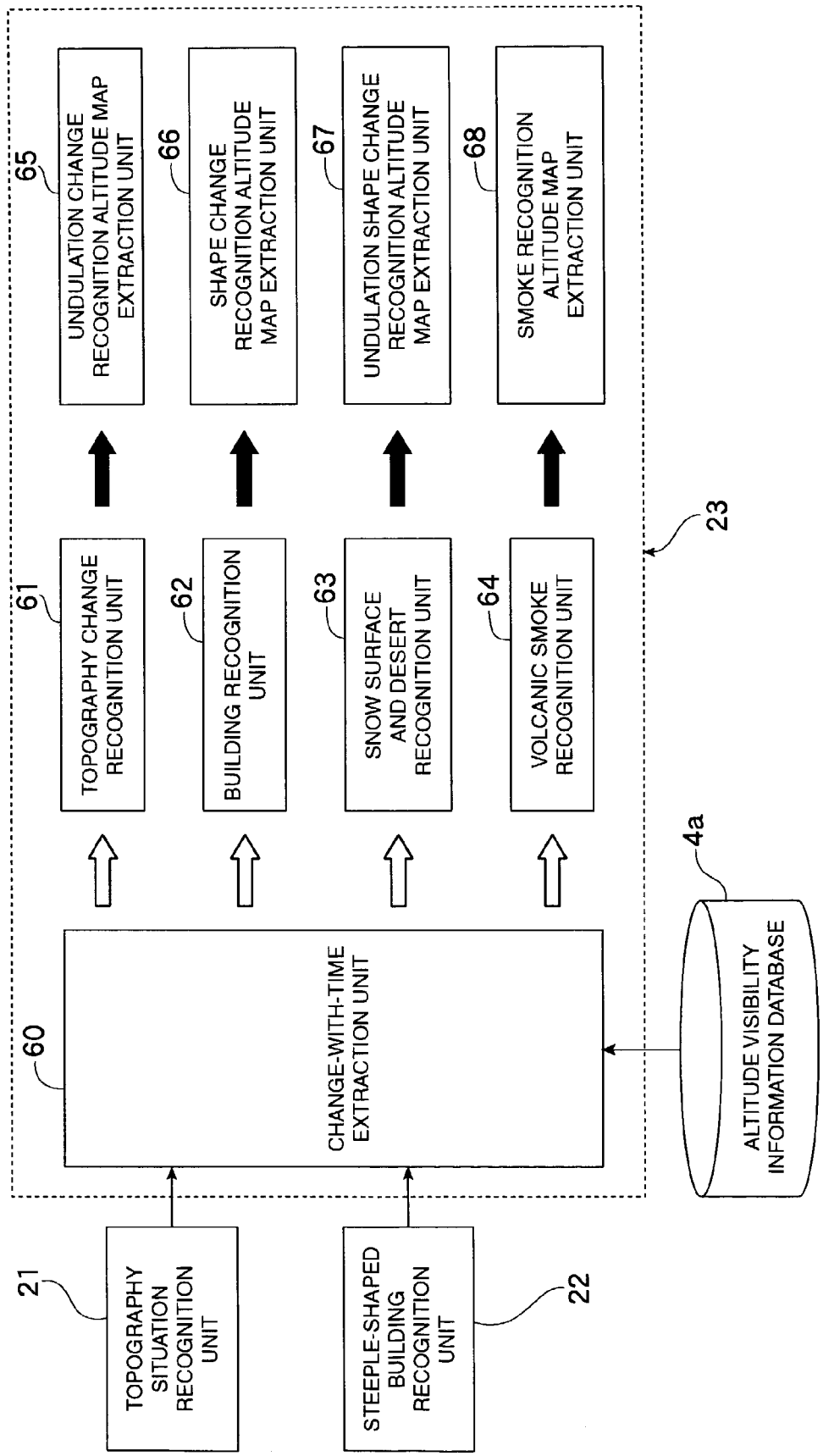
FIG. 5 is a functional block diagram of a time series recognition unit of a flight obstacle recognition system according to the present invention.

FIG. 5 shows a function block diagram of the time series recognition unit of the flight obstacle recognition system according to the present invention.

The time series recognition unit 23 includes a change-with-time extraction unit 60, a topography change recognition unit 61, a building recognition unit 62, a snow surface and desert recognition unit 63, a volcanic smoke recognition unit 64, an undulation change recognition altitude map extraction unit 65, a shape change recognition altitude map extraction unit 66, an undulation shape recognition altitude map extraction unit 67, and a smoke recognition altitude map extraction unit 68.

The digital elevation model information on the same location that changes with time is recognized by the time series recognition unit 23. It thus becomes possible to grasp novel buildings, changes of snow surfaces and desert surfaces, topographic situations such as the flow of volcanic smoke and fog, and the change of the atmospheric state.

By comparing the altitude visibility information received from the observation satellite 9 and processed this time by the topography situation recognition unit 21 and the steeple-shaped building recognition unit 22 with altitude visibility information of the same location preserved last time in the altitude visibility information database 4a of the altitude visibility information preservation apparatus 4 at the time of image processing, the change-with-time extraction unit 60 extracts differing altitude visibility information. The extracted altitude visibility information is delivered to the topography change recognition unit 61, the building recognition unit 62, the snow surface and desert recognition unit 63 and the volcanic smoke recognition unit 64.

The delivered altitude visibility information is analyzed by the topography change recognition unit 61. If the topography is different as a result of the analysis, then an undulation change recognition altitude map is extracted from the altitude visibility information by the undulation change recognition altitude map extraction unit 65.

In the same way, the delivered altitude visibility information is analyzed by the building recognition unit 62. If the buildings are different as a result of the analysis, then a shape change recognition altitude map is extracted from the altitude visibility information by the shape change recognition altitude map extraction unit 66.

In the same way, the delivered altitude visibility information is analyzed by the snow surface and desert recognition unit 63. If the snow surface and desert are different as a result of the analysis, then an undulation shape recognition altitude map is extracted from the altitude visibility information by the undulation shape recognition altitude map extraction unit 67.

In the same way, the delivered altitude visibility information is analyzed by the volcanic smoke recognition unit 64. A smoke recognition altitude map is extracted by the smoke recognition altitude map extraction unit 68.

Figure 6:
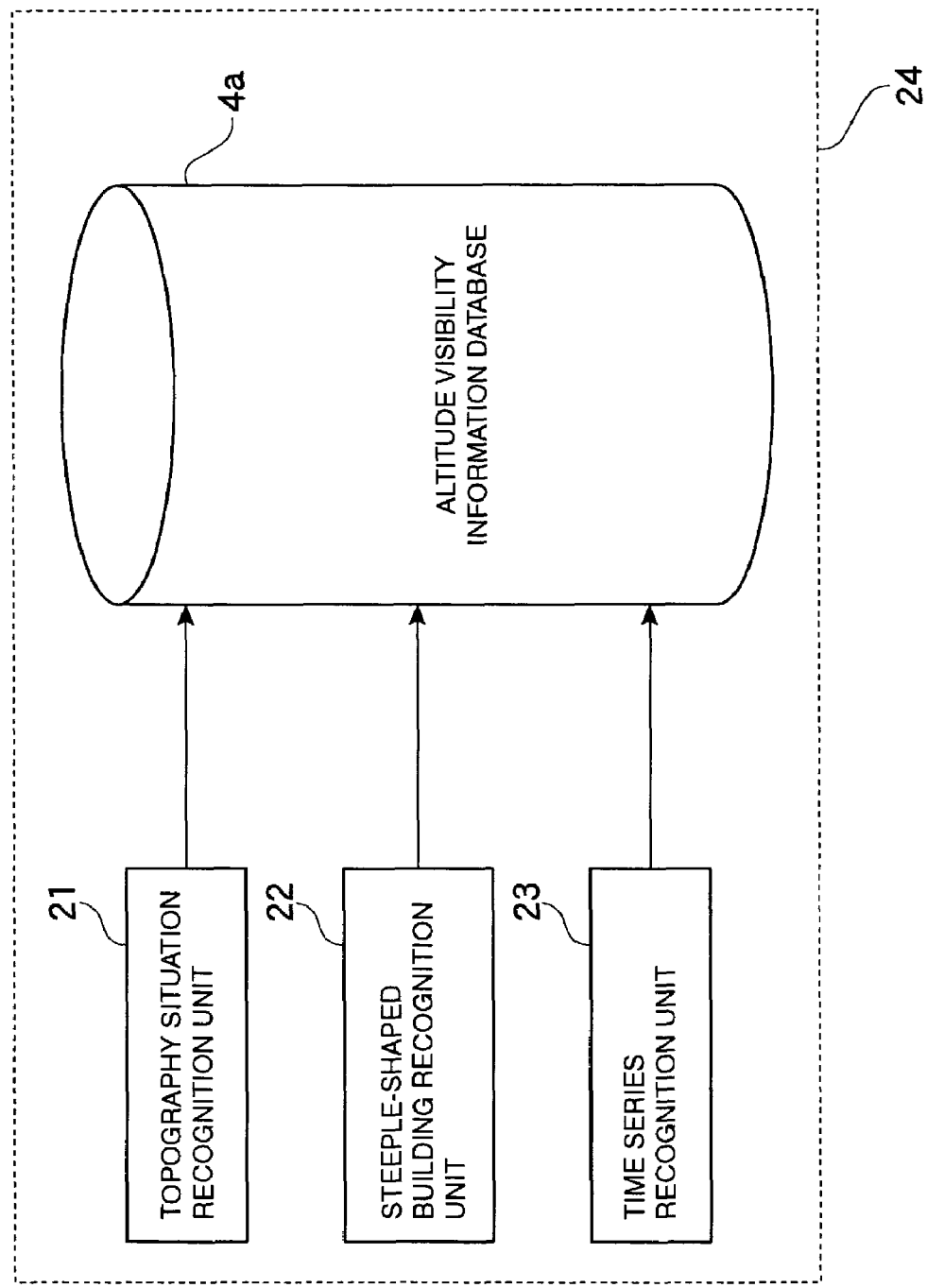
FIG. 6 is a functional block diagram of an altitude visibility information preservation unit of a flight obstacle recognition system according to the present invention.

FIG. 6 shows a function block diagram of the altitude visibility information preservation unit of the flight obstacle recognition system according to the present invention.

Altitude visibility information created by the topography situation recognition unit 21, the steeple-shaped building recognition unit 22, and the time series recognition unit 23 is preserved in the altitude visibility information database 4a by the altitude visibility information preservation unit 24. In the embodiment of the present invention, the altitude visibility information is preserved in the altitude visibility information database 4a. However, the medium for preservation may also be a recording medium such as a CD-ROM or a DVD.

Figure 7:
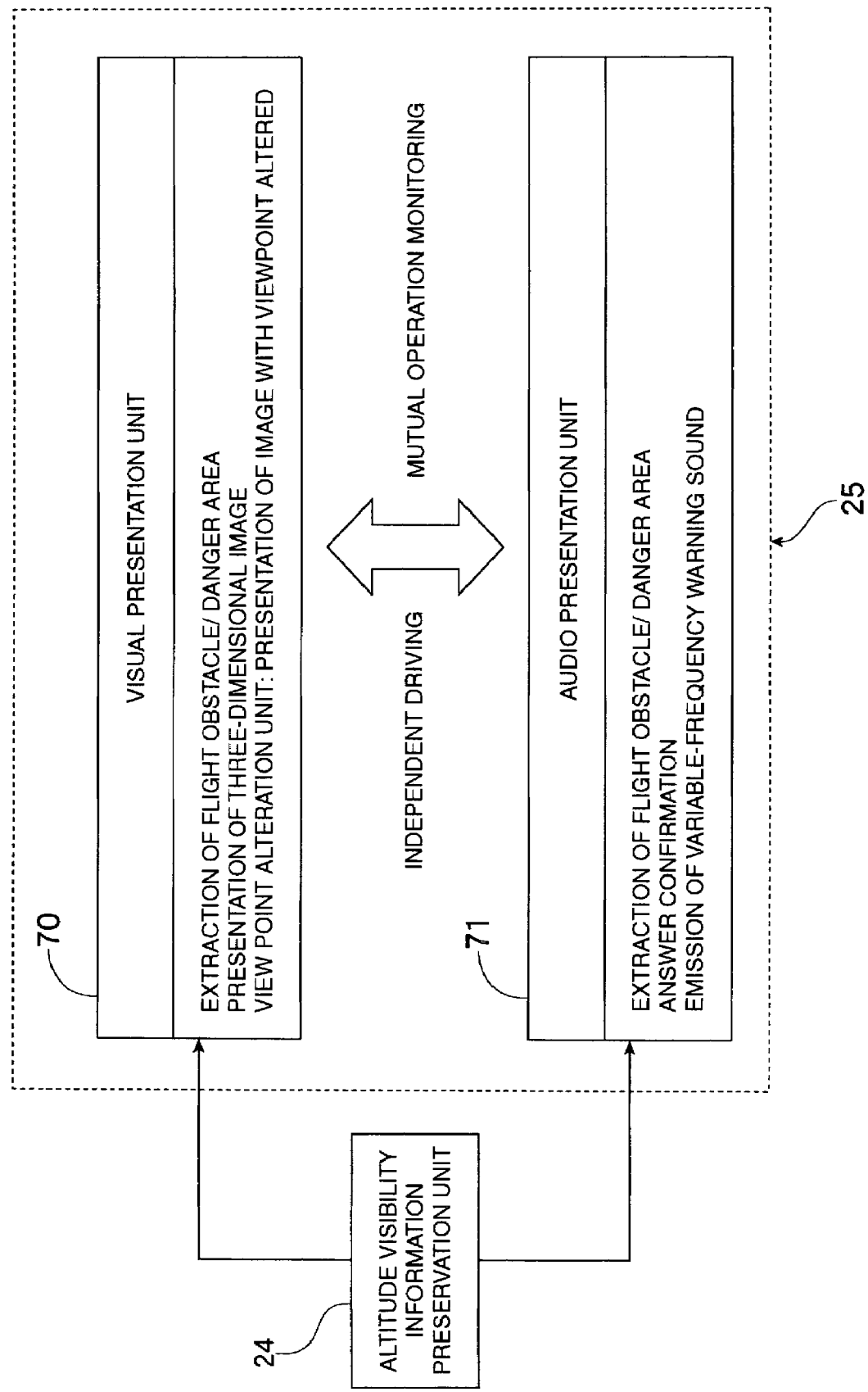
FIG. 7 is a functional block diagram of an altitude visibility information presentation unit of a flight obstacle recognition system according to the present invention.

FIG. 7 shows a function block diagram of the altitude visibility information presentation unit of the flight obstacle recognition system according to the present invention.

The altitude visibility information presentation unit 25 includes a visual presentation unit 70 and an audio presentation unit 71.

The altitude visibility information processed by the topography situation recognition unit 21, the steeple-shaped building recognition unit 22, and the time series recognition unit 23 and then preserved in the altitude visibility information database 4a by the altitude visibility information preservation unit 24 of the altitude visibility information preservation apparatus 4 is combined with location information supplied from the GPS and attitude information supplied from the gyro by the visual presentation unit 70. Altitude visibility information for flight obstacle recognition is thus created and displayed on the display 14 mounted on the aircraft 12.

The altitude visibility information for the flight obstacle recognition displayed on the display 14 can be displayed with the view point switched over, such as the view point of the pilot, a view point in the rear of the aircraft 12, a view point located right under the aircraft 12, or a view point located just beside the aircraft 12. Accordingly, it becomes possible to definitely recognize the location relationships between the aircraft 12 and the surrounding topographic situations and flight obstacles. In the case where the altitude visibility information for the flight obstacle recognition is displayed with the view point of the pilot, the approach of the aircraft 12 to an obstacle causes enlarged display of the obstacle and the nearby topography on the display 14 as well.

As an embodiment of the altitude visibility information presentation unit 25, the altitude visibility information preserved in the altitude visibility information database 4a of the altitude visibility information preservation apparatus 4 is displayed on the display 14 of the aircraft 12. Besides it, various presentation methods, such as printing altitude visibility information seen from a specific location and a specific angle by using a printer 16 and thereby creating a map, can be considered.

On the other hand, from the altitude visibility information preserved in the altitude visibility information database 4a of the altitude visibility information preservation apparatus 4 by the altitude visibility information preservation unit 24, the flight obstacles such as mountain areas and buildings, and the danger areas displayed on the display 14 are extracted. A variable frequency warning sound having a frequency, which changes according to the kind of the obstacle and the danger state, is emitted. This warning sound continues to be emitted until the pilot responds thereto.

The visual presentation unit 70 and the audio presentation unit 71 individually read the altitude visibility information and mutually monitor the operation state. For example, if a danger zone colored with a red color or the like is displayed on the display 14 by the visual presentation unit 70, the audio presentation unit 71, which has monitored the visual presentation unit 70, emits a warning sound.

Figure 8:
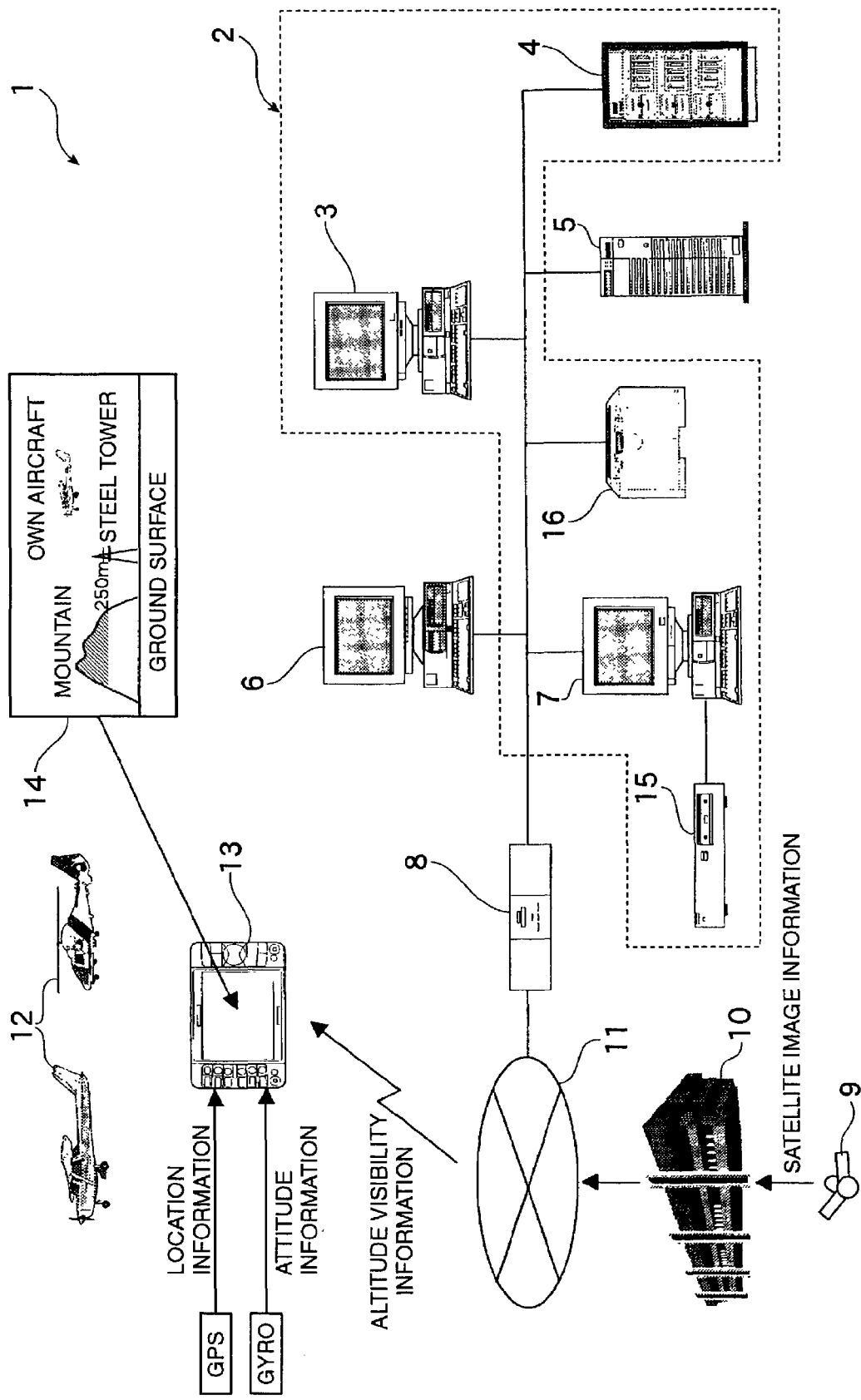
FIG. 8 is a configuration diagram of principal hardware components which is an embodiment of a flight obstacle recognition system according to the present invention.

FIG. 8 shows a configuration diagram of principal hardware components which is an embodiment of a flight obstacle recognition system according to the present invention.

In the flight obstacle recognition system 1, the altitude visibility information provision system 2 including a satellite image analysis and processing apparatus 3, the altitude visibility information preservation apparatus 4, and a system management and maintenance apparatus 7, an altitude visibility information downloading apparatus including an altitude visibility information server 5, an altitude visibility information server control apparatus 6, and a communication apparatus 8, and the flight obstacle presentation apparatus 13 on the aircraft 12 are connected via a communication line such as Internet 11.

The satellite image analysis and processing apparatus 3 has a function of conducting analysis and processing on high resolution satellite image information of a plurality of stereopairs acquired from the observation satellite 9 on an orbit around the earth via the Internet 11, thereby creating altitude visibility information and preserving the altitude visibility information in the altitude visibility information database 4a.

The altitude visibility information preservation apparatus 4 includes the altitude visibility information database 4a, which preserves the altitude visibility information created by the satellite image analysis and processing apparatus 3.

The altitude visibility information server 5 is a server having a function of receiving the high resolution satellite image information from the Internet 11, transmitting the received high resolution satellite image information to the satellite image analysis and processing apparatus 3, and downloading the altitude visibility information created by the satellite image analysis and processing apparatus 3 to the Internet 11.

The altitude visibility information server control apparatus 6 is an apparatus that controls downloading of the altitude visibility information to the Internet 11. The altitude visibility information server control apparatus 6 has a function of receiving a request of image downloading from the flight obstacle presentation apparatus 13 mounted on the aircraft 12, retrieving and extracting the altitude visibility information to be downloaded from the altitude visibility information preservation apparatus 4 and ordering the altitude visibility information server 5 to download the image.

The system management and maintenance apparatus 7 has a function of monitoring and managing the operation situation of the satellite image analysis and processing apparatus 3, the altitude visibility information preservation apparatus 4, the altitude visibility information server 5, the altitude visibility information server control apparatus 6, and the communication apparatus 8, which are connected to a LAN, and conducting maintenance on programs and data.

The embodiment of the flight obstacle recognition system 1 in the present invention will be described hereunder with reference to FIG. 8.

First, satellite image information is sent from the observation satellite 9 to a satellite image provider 10 and processed therein. High resolution satellite image information obtained by conducting the processing on the satellite image information is transmitted from the satellite image provider 10 to the altitude visibility information server 5 via the Internet 11. The satellite image analysis and processing apparatus 3 extracts the digital elevation model information including the topography data 40 and the steeple-shaped building data 50 from the high resolution satellite image information of the altitude visibility information server 5. The satellite image analysis and processing apparatus 3 conducts analysis and processing on the topography state, such as undulations of the ground surface, rivers, and sea, on the basis of the extracted topography data 40. The satellite image analysis and processing apparatus 3 conducts analysis and processing on the shape and location information of steeple-shaped building on the basis of the steeple-shaped building data 50.

In addition, by comparison with altitude visibility information preserved last time in the altitude visibility information database 4a of the altitude visibility information preservation apparatus 4, the satellite image analysis and processing apparatus 3 conducts analysis and processing of time-varying digital elevation model information, such as topography and buildings. The satellite image analysis and processing apparatus 3 combines these kinds of analyzed and processed altitude visibility information and preserves resultant synthetic information in the altitude visibility information preservation apparatus 4.

If the altitude visibility information server control apparatus 6 has received a request that an image be downloaded to the flight obstacle presentation apparatus 13 mounted on the aircraft 12, then the altitude visibility information server control apparatus 6 retrieves and extracts the requested altitude visibility information from the altitude visibility information preservation apparatus 4, and downloads the altitude visibility information to the flight obstacle presentation apparatus 13 mounted on the aircraft 12 via the Internet 11. The flight obstacle presentation apparatus 13 conducts the image synthesis and processing on the downloaded altitude visibility information, the location information of the aircraft 12 acquired from the GPS and the attitude information of the aircraft 12 acquired from the gyro. The altitude visibility information for flight obstacle recognition, such as the image seen from the view point of the pilot and a topographic map including the location of the aircraft 12, is displayed on the display 14 of the flight obstacle presentation apparatus 13.

In the present embodiment, although the Internet 11 is used as communication means, there is no restriction so long as it is communication means capable of downloading the altitude visibility information to the aircraft 12. Furthermore, data may be delivered by using a storage medium such as a CD-ROM or a DVD 15 without using the communication means.

In the embodiment, although the altitude visibility information is used for flight obstacle recognition, many applications may be diversified. For example, it is possible to select the flight path so as to avoid residential areas on the basis of the altitude visibility information and thereby solve the noise problem of airplanes. Otherwise, the function of the air traffic control may be enhanced by utilizing the altitude visibility information together with a pilot training simulator or a radar.

By using the altitude visibility information created from the high resolution satellite image for the purpose of flight obstacle recognition as described hereinbefore, it becomes possible to prevent a clash with a mountain at the time of poor visibility caused by fog or rain, or a contact accident with a steeple-shaped building such as a steel tower structure (including a transmission line) or a tall building in the flight paths over the entire world. It also becomes possible to acquire the flow direction of time-varying smoke and improve the safety of landing on time-varying snow surface or the like which tends to cause height misconception.

What is claimed is:

1. An altitude visibility information provision system comprising a satellite image analysis and processing apparatus and an altitude visibility information preservation apparatus, said satellite image analysis and processing apparatus comprising:

a DEM (digital elevation model) extraction unit operable to extract digital elevation model information having topography data and steeple-shaped building data from satellite image information of stereopairs differing in resolution obtained by picking up an image of ground surface and received from an observation satellite on an orbit around the earth via a communication line and high resolution satellite image information processed based on the satellite image information;

a topography situation recognition unit operable to discriminate a kind of topography and to recognize a topographic situation from the topography data of the digital elevation model information;

a steeple-shaped building recognition unit operable to recognize shape and location information of steeple-shaped buildings from the steeple-shaped building data of the digital elevation model information;

a time series recognition unit operable to recognize a change with time by comparing the high resolution satellite image information previously received with the high resolution satellite image information of a same location currently received; and an altitude visibility information preservation unit operable to preserve altitude visibility information obtained by combining information acquired by said topography situation recognition unit, information acquired by said steeple-shaped building recognition unit, and information acquired by said time series recognition unit in an altitude visibility information database provided in said altitude visibility information preservation apparatus, wherein said steeple-shaped recognition unit includes a transmission line recognition unit, a steel tower structure recognition unit, and a tall building recognition unit, wherein said transmission line recognition unit is operable to analyze the steeple-shaped building data in order to determine whether the steeple-shaped building data is information pertaining to a transmission line image, and wherein, if it is determined that the steeple-shaped building data is information pertaining to a transmission line image, a line shape of the transmission line is recognized and location information regarding the transmission line is extracted, wherein said steel tower structure recognition unit is operable to analyze the steeple-shaped building data in order to determine whether the steeple-shaped building data is information pertaining to a steel tower structure image, and wherein, if it is determined that the steeple-shaped building data is information pertaining to a steel tower structure image, a shape of the steel tower structure is recognized and location information regarding the steel tower structure is extracted, wherein said tall building recognition unit is operable to analyze the steeple-shaped building data in order to determine whether the steeple-shaped building data is information pertaining to a tall building image, and wherein, if it is determined that the steeple-shaped building data is information pertaining to a tall building image, a shape of the tall building is recognized and location information regarding the tall building is extracted, wherein said time series recognition unit includes a change-with-time extraction unit, a topography chance recognition unit, a building recognition unit, a snow surface and desert recognition unit, and a volcanic smoke recognition unit, wherein said change-with-time extraction unit is operable to extract differing altitude visibility information by comparing the altitude visibility information currently received and processed by said topography situation recognition unit and said steeple-shaped building recognition unit with altitude visibility information of the same location previously received and preserved by said altitude visibility information preservation unit, wherein said change-with-time extraction unit is operable to deliver the extracted altitude visibility information to said topography change recognition unit, said building recognition unit. said snow surface and desertion recognition unit, and said volcanic smoke recognition unit, wherein said topography change recognition unit is operable to analyze the altitude visibility information delivered by said change-with-time extraction unit, and wherein, if the topography is determined to be different as a result of the analysis by said topography change recognition unit, an undulation change recognition altitude map is extracted from the altitude visibility information by an undulation change recognition altitude map extraction unit, wherein said building recognition unit is operable to analyze the altitude visibility information delivered by said change-with-time extraction unit, and wherein, if the buildings are determined to be different as a result of the analysis by said building recognition unit, a shape change recognition altitude map is extracted from the altitude visibility information by a shape change recognition altitude map extraction unit, wherein said snow surface and desert recognition unit is operable to analyze the altitude visibility information delivered by said change-with-time extraction unit, and wherein, if the snow surface and desert are determined to be different as a result of the analysis by said snow surface and desert recognition unit, an undulation shape recognition altitude map is extracted from the altitude visibility information by an undulation shape recognition altitude map extraction unit, and wherein said volcanic smoke recognition unit is operable to analyze the altitude visibility information delivered by said change-with-time extraction unit, and wherein, if the smoke is determined to be different as a result of the analysis by said volcanic smoke recognition unit, a smoke recognition altitude map is extracted from the altitude visibility information by a smoke recognition altitude map extraction unit.

2. An altitude visibility information provision system comprising a satellite image analysis and processing apparatus and an altitude visibility information preservation apparatus, said satellite image analysis and processing apparatus comprising:

a DEM (digital elevation model) extraction unit operable to extract digital elevation model information having topography data and steeple-shaped building data from satellite image information of stereopairs differing in resolution obtained by picking up an image of ground surface and received from an observation satellite on an orbit around the earth via a communication line and high resolution satellite image information processed based on the satellite image information;

a topography situation recognition unit operable to discriminate a kind of topography and to recognize a topographic situation from the topography data of the digital elevation model information;

a steeple-shaped building recognition unit operable to recognize shape and location information of steeple-shaped buildings from the steeple-shaped building data of the digital elevation model information;

a time series recognition unit operable to recognize a change with time by comparing the high resolution satellite image information previously received with the high resolution satellite image information of a same location currently received; and an altitude visibility information preservation unit operable to preserve altitude visibility information obtained by combining information acquired by said topography situation recognition unit, information acquired by said steeple-shaped building recognition unit, and information acquired by said time series recognition unit in an altitude visibility information database provided in said altitude visibility information preservation apparatus, wherein said time series recognition unit includes a change-with-time extraction unit, a topography change recognition unit, a building recognition unit, a snow surface and desert recognition unit, and a volcanic smoke recognition unit, wherein said change-with-time extraction unit is operable to extract differing altitude visibility information by comparing the altitude visibility information currently received and processed by said topography situation recognition unit and said steeple-shaped building recognition unit with altitude visibility information of the same location previously received and preserved by said altitude visibility information preservation unit, wherein said change-with-time extraction unit is operable to deliver the extracted altitude visibility information to said topography change recognition unit, said building recognition unit, said snow surface and desertion recognition unit, and said volcanic smoke recognition unit, wherein said topography change recognition unit is operable to analyze the altitude visibility information delivered by said change-with-time extraction unit, and wherein, if the topography is determined to be different as a result of the analysis by said topography change recognition unit, an undulation change recognition altitude map is extracted from the altitude visibility information by an undulation change recognition altitude map extraction unit, wherein said building recognition unit is operable to analyze the altitude visibility information delivered by said change-with-time extraction unit, and wherein, if the buildings are determined to be different as a result of the analysis by said building recognition unit, a shape change recognition altitude map is extracted from the altitude visibility information by a shape change recognition altitude map extraction unit, wherein said snow surface and desert recognition unit is operable to analyze the altitude visibility information delivered by said change-with-time extraction unit, and wherein, if the snow surface and desert are determined to be different as a result of the analysis by said snow surface and desert recognition unit, an undulation shape recognition altitude map is extracted from the altitude visibility information by an undulation shape recognition altitude map extraction unit, and wherein said volcanic smoke recognition unit is operable to analyze the altitude visibility information delivered by said change-with-time extraction unit, and wherein, if the smoke is determined to be different as a result of the analysis by said volcanic smoke recoanition unit, a smoke recognition altitude map is extracted from the altitude visibility information by a smoke recognition altitude map extraction unit.

3. A flight obstacle presentation apparatus mounted on an aircraft apparatus comprising:

a display operable to combine the altitude visibility information of said altitude visibility information provision system according to claim 1 with location information and altitude information of the aircraft, and to display altitude visibility information for flight obstacle recognition including an image taken from a viewpoint of a pilot and a location of the aircraft; and a warning sound emission unit operable to emit a warning sound when a flight obstacle is sensed and the flight obstacle is displayed on said display.

4. A flight obstacle recognition system comprising an altitude visibility information downloading apparatus for downloading, via a communication line, the altitude visibility information of said altitude visibility information provision system according to claim 1 to a flight obstacle presentation apparatus mounted on an aircraft apparatus, said flight obstacle presentation apparatus comprising:

a display operable to combine the altitude visibility information of said altitude visibility information provision system with location information and altitude information of the aircraft, and to display altitude visibility information for flight obstacle recognition such as a topographic map including an image taken from a viewpoint of a pilot and a location of the aircraft; and a warning sound emission unit operable to emit a warning sound when a flight obstacle is sensed and the flight obstacle is displayed on said display.

5. A method for providing altitude visibility information comprising:

extracting digital elevation model information having topography data and steeple-shaped building data from satellite image information of stereopairs differing in resolution obtained by picking up an image of ground surface and received from an observation satellite on an orbit around the earth via a communication line and high resolution satellite image information processed based on the satellite image information;

discriminating a kind of topography and recognizing a topographic situation from the topography data of the digital elevation model information;

recognizing shape and location information of steeple-shaped buildings from the steeple-shaped building data of the digital elevation model information;

recognizing a change with time by comparing the high resolution satellite image information previously received with the high resolution satellite image information of a same location currently received; and preserving altitude visibility information obtained by combining information acquired at said topography situation recognizing step and information acquired at said steeple-shaped building recognizing step in an altitude visibility information database, wherein said recognizing shape and location information of steeple-shaped buildings from the steeple-shaped building data of the digital elevation model information comprises:

analyzing the steeple-shaped building data in order to determine whether the steeple-shaped building data is information pertaining to a transmission line image, and wherein, if it is determined that the steeple-shaped building data is information pertaining to a transmission line image, recognizing a line shape of the transmission line and extracting location information regarding the transmission line;

analyzing the steeple-shaped building data in order to determine whether the steeple-shaped building data is information pertaining to a steel tower structure image, and wherein, if it is determined that the steeple-shaped building data is information pertaining to a steel tower structure image, recognizing a shape of the steel tower structure and extracting location information regarding the steel tower structure;

analyzing the steeple-shaped building data in order to determine whether the steeple-shaped building data is information pertaining to a tall building image, and wherein, if it is determined that the steeple-shaped building data is information pertaining to a tall building image, recognizing a shape of the tall building and extracting location information regarding the tall building; and wherein said recognizing a change with time by comparing the high resolution satellite image information previously received with the high resolution satellite image information of the same location currently received comprises:

extracting differing altitude visibility information by comparing the altitude visibility information currently received and processed with altitude visibility information of the same location previously received and preserved;

delivering the extracted altitude visibility information to a topography change recognition unit, a building recognition unit, a snow surface and desertion recognition unit, and a volcanic smoke recognition unit;

analyzing, by the topography change recognition unit, the delivered altitude visibility information, wherein, if the topography is determined to be different as a result of the analysis, extracting an undulation change recognition altitude map from the altitude visibility information;

analyzing, by the building recognition unit, the delivered altitude visibility information, wherein, if buildings are determined to be different as a result of the analysis, extracting a shape change recognition altitude map from the altitude visibility information;

analyzing, by the snow surface and desert recognition unit, the delivered altitude visibility information, wherein, if the snow surface and desert are determined to be different as a result of the analysis, extracting an undulation shape recognition altitude map from the altitude visibility information; and analyzing, by the volcanic smoke recognition unit, the delivered altitude visibility information, wherein, if smoke is determined to be different as a result of the analysis, extracting a smoke recognition altitude map from the altitude visibility information.

6. A method for providing altitude visibility information comprising:

extracting digital elevation model information having topography data and steeple-shaped building data from satellite image information of stereopairs differing in resolution obtained by picking up an image of ground surface and received from an observation satellite on an orbit around the earth via a communication line and high resolution satellite image information processed based on the satellite image information;

discriminating a kind of topography and recognizing a topographic situation from the topography data of the digital elevation model information;

recognizing shape and location information of steeple-shaped buildings from the steeple-shaped building data of the digital elevation model information;

recognizing a change with time by comparing the high resolution satellite image information previously received with the high resolution satellite image information of a same location currently received; and preserving altitude visibility information obtained by combining information acquired at said topography situation recognizing step, information acquired at said steeple-shaped building recognizing step, and information acquired at said change with time recognizing step in an altitude visibility information database, wherein said recognizing a change with time by comparing the high resolution satellite image information previously received with the high resolution satellite image information of the same location currently received comprises:

extracting differing altitude visibility information by comparing the altitude visibility information currently received and processed with altitude visibility information of the same location previously received and preserved;

delivering the extracted altitude visibility information to a topography change recognition unit, a building recognition unit, a snow surface and desertion recognition unit, and a volcanic smoke recognition unit;

analyzing, by the topography change recognition unit, the delivered altitude visibility information, wherein, if the topography is determined to be different as a result of the analysis, extracting an undulation change recognition altitude map from the altitude visibility information;

analyzing, by the building recognition unit, the delivered altitude visibility information, wherein, if buildings are determined to be different as a result of the analysis, extracting a shape change recognition altitude map from the altitude visibility information;

analyzing, by the snow surface and desert recognition unit, the delivered altitude visibility information, wherein, if the snow surface and desert are determined to be different as a result of the analysis, extracting an undulation shape recognition altitude map from the altitude visibility information; and analyzing, by the volcanic smoke recognition unit, the delivered altitude visibility information, wherein, if smoke is determined to be different as a result of the analysis, extracting a smoke recognition altitude map from the altitude visibility information.

7. A method for presenting flight obstacles in a flight obstacle presentation apparatus of an aircraft comprising:

combining the altitude visibility information of said altitude visibility information provision method according to claim 5 with location information and altitude information of the aircraft, and displaying altitude visibility information for flight obstacle recognition including an image taken from a viewpoint of a pilot and a location of the aircraft on a display of the flight obstacle presentation apparatus; and emitting a warning sound when a flight obstacle is sensed and the flight obstacle is displayed on the display of the flight obstacle presentation apparatus.

8. A flight obstacle recognition method comprising: downloading, via a communication line, the altitude visibility information of said altitude visibility information provision method according to claim 5 to a flight obstacle presentation apparatus.

9. A flight obstacle presentation apparatus mounted on an aircraft apparatus comprising:

a display operable to combine the altitude visibility information of said altitude visibility information provision system according to claim 2 with location information and altitude information of the aircraft, and to display altitude visibility information for flight obstacle recognition including an image taken from a viewpoint of a pilot and a location of the aircraft; and a warning sound emission unit operable to emit a warning sound when a flight obstacle is sensed and the flight obstacle is displayed on said display.

10. A flight obstacle recognition system comprising an altitude visibility information downloading apparatus for downloading, via a communication line, the altitude visibility information of said altitude visibility information provision system according to claim 2 to a flight obstacle presentation apparatus mounted on an aircraft apparatus, said flight obstacle presentation apparatus comprising:

a display unit operable to combine the altitude visibility information of said altitude visibility information provision system with location information and altitude information of the aircraft, and to display altitude visibility information for flight obstacle recognition including an image taken from a viewpoint of a pilot and a location of the aircraft; and a warning sound emission unit operable to emit a warning sound when a flight obstacle is sensed and the flight obstacle is displayed on said display.

11. A method for presenting flight obstacles in a flight obstacle presentation apparatus of an aircraft comprising:

combining the altitude visibility information of said altitude visibility information provision method according to claim 6 with location information and altitude information of the aircraft, and displaying altitude visibility information for flight obstacle recognition such as a topographic map including an image taken from a viewpoint of a pilot and a location of the aircraft on a display of the flight obstacle presentation apparatus; and emitting a warning sound when a flight obstacle is sensed and the flight obstacle is displayed on the display of the flight obstacle presentation apparatus.

12. A flight obstacle recognition method comprising: downloading, via a communication line, the altitude visibility information of said altitude visibility information provision method according to claim 6 to a flight obstacle presentation apparatus.

* * * * *